Patented May 18, 1943

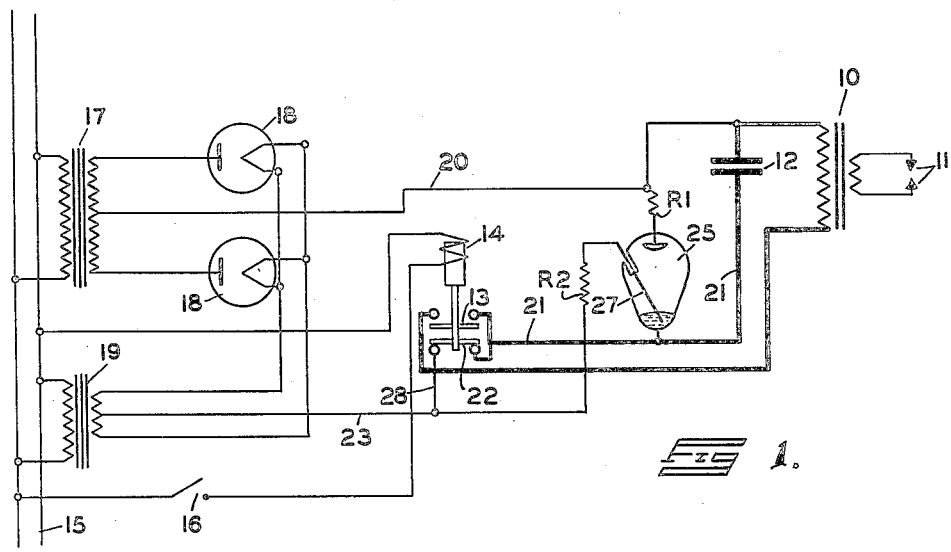
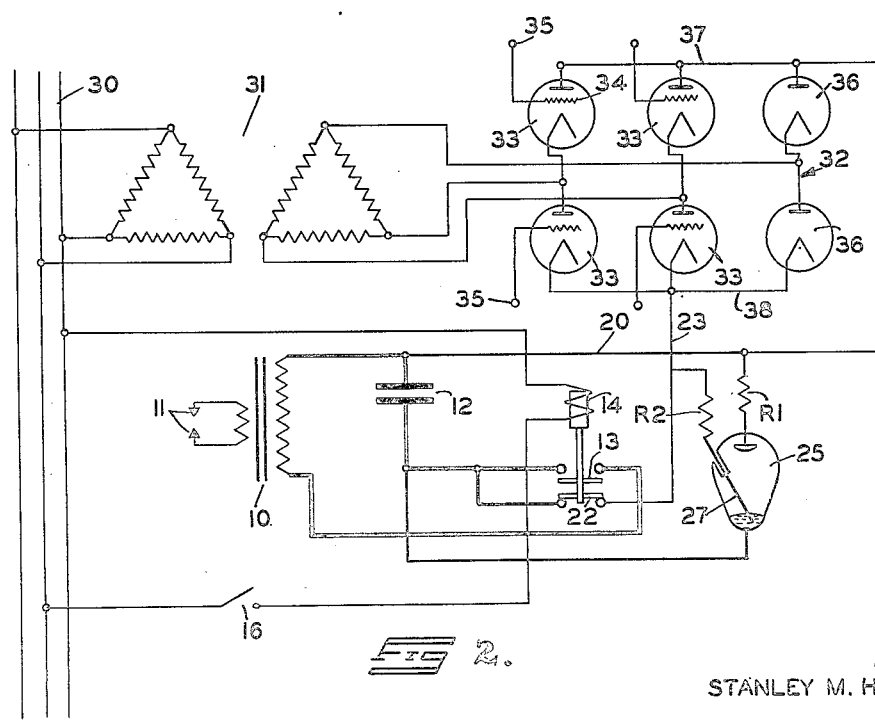

2,319,763

UNITED STATES PATENT OFFICE 2,319,763

WELDING CIRCUIT

Stanley M. Humphrey, Warren, Ohio, assignor to The Taylor-Winfield Corporation, Warren, Ohio, a corporation of Ohio Application September 3, 1941, Serial No. 409,336

5 Claims. (Cl. 219—4)

This invention relates to an electric welding system and more particularly to an improved circuit for supplying a unidirectional surge of welding current from an energy storing device or capacitor to a low impedance load as, for example, the primary winding of a welding transformer. The invention, therefore, is concerned primarily with providing an improved and simplified circuit for discharging a capacitor of large capacity to a low impedance load in such manner that transitory oscillations in the load current are prevented.

The present invention is concerned primarily with an electrical welding system of the general type disclosed and claimed in my co-pending application, Serial No. 379,084, filed February 15, 1941 and, in certain respects, represents an improvement over the system disclosed in said application. The welding power supply, which forms a substantial part of the welding apparatus involved, consists essentially of a condenser or capacitor of large capacity or in the preferred physical embodiment thereof, of a multipliicty of capacitors connected in parallel, a charging circuit for the capacitor and a discharging circuit for the same to convey the stored electrical energy to the load which, in case of welding apparatus, is the welding electrodes or the primary circuit of a welding transformer. As pointed out in said co-pending application, the desired discharge circuit characteristics may be attained by employing rectifiers intermediate the secondaries of a charging transformer and the capacitor and constructing these secondary windings of sufficiently low impedance to prevent oscillation in the circuit, assuming, of course, that the secondaries and rectifiers are always connected with the capacitor. To enable the charging of the capacitor to proceed at a more practicable rate and to enable rectifier tubes of moderate size to be employed, a polyphase charging transformer is employed with a multiple phase star-connected secondary, each leg of which is wound with parallel conductors on a separate iron core in such manner that there is low leakage reactance between them whereby the current will be equally distributed among the rectifier tubes connected to each of the conductors. Regardless of this distribution, in certain installations, it is found that the magnitude of the shunt current required to prevent oscillation in the load circuit is greater than the rectifier tubes themselves are able to carry. Heretofore, the practice has been, under circumstances of this nature, to employ gas or arc discharge device of large capacity as a shunt rectifier (in parallel with the capacitor) and an auxiliary hot-cathode tube to control the grid or ignitor and consequently the conduction in the rectifier at the proper point in a cycle of the discharge wave.

A more specific object of the present invention is to improve and simplify the design, construction, and control of a circuit arrangement provided for the purpose of preventing an oscillatory discharge from a large capacitor to a low impedance load wherein the circuit constants are such that the rectifier tubes normally employed in charging the capacitor are of insufficient capacity to carry the shunt current. This object is accomplished in accordance with the present invention by employing a shunt rectifier tube of substantial capacity and by controlling the conduction in the tube in accordanc with the magnitude of the shunt current impressed on the charging rectifiers employed. In this manner the circuit is substantially simplified and the need for the additional hot-cathode grid or ignitor control tube is eliminated.

The shunt rectifier preferably employed in the practice of the invention is of the "ignitron" tube type in which the anode is of metal, such as nickel or carbon, and the cathode consists of a pool of mercury into which extends an igniting electrode comprising a high resistance element, such as silicon carbide or boron carbide. A discharge device of this nature is well-suited for its intended function, since it is capable of conducting the heavy currents encountered even in the installations utilizing capacitors of very large values, although it should be understood that discharge devices of the hot-cathode type may be utilized where the load requirements are more moderate.

Further, it should become apparent upon the following exposition of the invention that the novel principle of the invention is generic and is capable of application in the discharge circuit, regardless of the specific type of charging rectifiers employed and of the specific transformer and connecting network interposed between the charging line and the charging rectifiers.

The above and other objects and advantages of the invention will become apparent from a consideration of the accompanying drawing and the following detailed specification wherein there is specifically disclosed certain representative embodiments of the invention.

In the drawing:

Figure 1 is a diagrammatic showing of a representative electric welding circuit embodying the principles of the invention and utilizing a straight full wave single phase rectifier for charging the welding capacitor; and Figure 2 is a diagrammatic showing of a modified form of circuit embodying the principles of the invention in which a three phase bridge type of rectifier with grid control is utilized to supply the capacitor charging current.

Referring now to Figure 1, reference numeral 10 designates a welding transformer for supplying welding energy to the electrodes 11 and the primary of this transformer is arranged to be energized by the discharge of a large capacitor 12. A switch 13 is provided to connect capacitor 12 in series with the primary of the welding transformer 10 in effecting a weld and switch 13 is in turn controlled by solenoid 14 which derives energy from the line 15 and is under the control of a switch 16 which may be either manually or automatically actuated in conjunction with the operation of the welding machine.

Energy for charging capacitor 12 is derived from charging transformer 17, whose primary is connected across the line 15. In practice, a suitable interruptor may be employed in the primary circuit to disconnect the transformer from the line when a predetermined charge has been attained on the capacitor 12. The secondary winding of transformer 17 is connected to the hot-cathode rectifier tubes 18 which derive their heating current from a small transformer 19, the primary of which is always connected across the line 15. A conductor 20 extends between the center tap of the secondary of transformer 17 and one side of the capacitor 12 and a second conductor 21, switch 22 and third conductor 23 connects the other side of the capacitor with the center tap of the secondary of the transformer 19 to complete the charging circuit.

A discharge device 25, preferably of the arc discharge or "ignitron" tube type, as explained above, is connected in shunt with the capacitor 12 through conductors 20 and 21 and resistance R1. Discharge device 25, which serves as a shunt rectifier, is provided with an ignition electrode 27 which extends down into the mercury pool in the tube. Electrode 27 is connected with conductor 23 through resistance R2 and it should be apparent that when switch 22 is opened, electrode 27 is connected across capacitor 12 through conductor 20, the secondary of transformer 17, rectifiers 18, conductor 23, R2 and conductor 21.

Switch 22 is provided for the purpose of connecting the positive side of the rectifier output directly with the capacitor 12, this being accomplished through conductors 23, 28 and 21 to protect the ignition electrode 27 during charging of the capacitor and, therefore, switch 22 is normally closed, as indicated, and is opened only when switch 16 is closed to discharge the capacitor through the welding load. In practice, the capacitor 12 is charged through rectifiers 18 until a predetermined charge is attained therein upon which charging current may be interrupted, as explained above, and upon actuation of the mechanical parts of the welding machine, firing switch 16 is closed to energize solenoid 14 thereby closing switch 13 and opening switch 22. Closing of switch 13 connects the capacitor 12 across the primary of welding transformer 10 and initiates flow of the welding current. The discharge from capacitor 12 tends to oscillate but as the polarity on the capacitor reverses, rectifier tubes 18 begin to conduct and current flows through conductor 23, resistance R2 and electrode 27. When the value of this current reaches the amount for which the tube 25 is constructed, the tube immediately becomes fully conductive and from this point on, substantially all of the shunt current is handled by the shunt rectifier. By reason of its ability to transmit heavy currents, the shunt rectifier of the arc discharge type is well-suited for all installations, including those in which capacitors of very large capacity are employed but if, however, the power requirements are substantially less, the gas discharge tube may be replaced by spaced discharge devices with suitable circuit modifications.

As pointed out above, an important feature of the invention is the utilization of the rectifier normally employed in charging the capacitor as a source of potential for controlling a shunt rectifier and this object may be accomplished, regardless of the specific type of rectifier employed. In Figure 2 there is disclosed, by way of example, a system in which charging current is supplied from a three phase source 30 through a delta connected transformer 31 and a bridge connected rectifier network 32 which is provided with grid control for controlling the charging of the capacitor 12. Of the six rectifier tubes employed, four, each indicated by reference numeral 33, are provided with control grids 34 suitably connected at 35 to a control biasing source, not shown, while the two remaining oppositely connected tubes 36 are without grids to provide an uncontrolled path for the flow of current across the rectifier network. The anodes of the secondary-cathode connected rectifiers 33, 36 are each connected to a common conductor 37, which in turn connects with conductor 20, the latter corresponding precisely with the conductor 20 of Figure 1. The cathodes of the oppositely connected rectifiers 33, 36 are connected by a common conductor 38 which in turn connects with conductor 23 corresponding to the conductor 23 of Figure 1. Thus the capacitor charging and discharging circuit past the charging rectifier proper is exactly the same in both embodiments illustrated and in considering Figure 2, it should be apparent that upon closing of the firing switch 16 and the consequent discharging of capacitor 12 that as the polarity on the capacitor 12 reverses, current will flow through the uncontrolled rectifiers 36, through resistance R2 and through starting electrode 27 thereby rendering tube 25 fully conductive after which this tube carries substantially all the shunt current. Resistance R1 limits the initial current through the discharge device 25 to a safe value and prevents very high frequency oscillations in the circuit consisting of capacitor 12, discharge device 25 and the leads connecting the two together.

It should now be apparent that the invention provides an improved circuit for charging a condenser of large capacity and for discharging the condenser through a low impedance load which accomplishes the objects initially set out. By the use of the invention, it is possible to simplify the design and construction of circuit arrangements for these purposes which in turn enables more rugged and economical practical embodiments of the welding machine to be provided. The invention is capable of wide adaptation and the two specific uses disclosed in detail should be considered as illustrative only and not in a limiting sense. For example, the invention may be used in conjunction with a charging system in which a polyphase transformer, having its secondary windings connected in star and so arranged that six-phase power is supplied, is employed, all as suggested in the co-pending application referred to above. Reference should therefore be had to the appended claims in determining the scope of the invention.

What I claim is:

1. In an electric resistance welding apparatus having a capacitor for supplying welding current and a circuit for discharging said capacitor through the welding load, means to charge said capacitor comprising a rectifier, and means to prevent oscillation in said circuit during the flow of welding current therein comprising a controlled discharge device in parallel with said capacitor and a connection between said rectifier and the control element of said discharge device to render said discharge device conductive upon the reversal of polarity on said capacitor as determined by conduction through said rectifier.

2. In an electric resistance welding apparatus having a capacitor for supplying welding current and a circuit for discharging said capacitor through the welding load; means to charge said capacitor comprising a rectifier; and means to prevent oscillation in said circuit during the flow of welding current therein comprising an arc discharge device connected across said capacitor, said discharge device having an ignition electrode, and a control circuit including said capacitor, rectifier and ignition electrode in series to render said discharge device conductive upon reversal of polarity on said capacitor as detected by conduction through said rectifier.

3. In an electric resistance welding apparatus having a capacitor for supplying welding current and a circuit for discharging said capacitor through the welding load, a switch in said circuit, means to charge said capacitor comprising a rectifier and a second switch connecting the output of said rectifier directly to said capacitor; and means to prevent oscillation in said circuit during the flow of welding current therein comprising an arc discharge device connected across said capacitor, said discharge device having an ignition electrode connected to the output of said rectifier in parallel with said second mentioned switch, and means to simultaneously close said first mentioned switch and open said second mentioned switch whereby said discharge device is rendered conductive upon reversal of polarity on said capacitor as detected by conduction through said rectifier.

4. In an electric resistance welding apparatus having a capacitor for supplying welding current and a circuit including a switch for discharging said capacitor through the welding load; means to charge said capacitor comprising a rectifier and a second switch connecting the output of said rectifier directly with said capacitor; and means to prevent oscillation in said circuit during the flow of welding current therein comprising a discharge device having an anode connected to one side of said capacitor, a cathode connected to the other side of said capacitor, and a control electrode, a connection in parallel with said second switch between the output of said rectifier and said control electrode, and means to simultaneously close said first mentioned switch and open said second mentioned switch whereby said discharge device is rendered conductive upon reversal of polarity on said capacitor as detected by conduction through said rectifier.

5. Apparatus for supplying unidirectional current of high amplitude and short duration to a low impedance load comprising in combination a large capacitor, a charging circuit for said capacitor including a rectifier, a discharge circuit interconnecting said capacitor and said load, and a discharge device in parallel with said capacitor having a control element adapted to be connected with said rectifier whereby said discharge device is rendered conductive upon the reversal of polarity on said capacitor as detected by conduction through said rectifier.

STANLEY M. HUMPHREY.